United States Patent [19]

Onuki et al.

[11] Patent Number: 4,879,572

[45] Date of Patent: Nov. 7, 1989

[54] READER-PRINTER

[75] Inventors: Kazuhiko Onuki, Tokyo; Masami Maetani, Ohmiya; Masahiko Ito, Yokohama; Shinji Murata, Tokyo, all of Japan

[73] Assignee: Canon Kabushiki Kaisha, Tokyo, Japan

[21] Appl. No.: 195,392

[22] Filed: May 13, 1988

Related U.S. Application Data

[63] Continuation of Ser. No. 74,146, Jul. 16, 1987, abandoned.

[30] Foreign Application Priority Data

Jul. 26, 1986 [JP] Japan ............................... 61-176350
Nov. 8, 1986 [JP] Japan ............................... 61-266196

[51] Int. Cl.$^{4}$ ............................................. G03B 13/28
[52] U.S. Cl. ........................................ 355/45; 355/51; 355/66; 355/68
[58] Field of Search ....................... 355/44, 45, 51, 66, 355/67, 68

[56] References Cited

U.S. PATENT DOCUMENTS 3,663,101 5/1972 Grabe .................................... 355/45
4,589,767 5/1986 Yanagi et al. ......................... 355/45

*Primary Examiner*—Monroe H. Hayes
*Attorney, Agent, or Firm*—Fitzpatrick, Cella, Harper & Scinto

[57] ABSTRACT

A reader-printer has a first mirror rotatable to a first position in which it is capable of forming a reader optical path for projecting an image light onto a screen and a second position in which it is capable of forming a printer optical path for projecting the image light onto a photosensitive surface, a second mirror disposed in the reader optical path for disposed in the reader optical path for directing the light from the first mirror to the screen, a third mirror disposed in the printer optical path for directing the light from the first mirror to the photosensitive surface, a driving device for rotating the first mirror to the first position and the second position, and a detecting device disposed outside the reader optical path and the printer optical path for receiving the reflected light from the first mirror during the rotation of the first mirror and detecting the image density.

10 Claims, 3 Drawing Sheets

5
6
8
3'
3a
7
3
20
2
4
Fa
12
F
10
11
1
13
15
L
17
9
14
Pa
P
18
16

20
4
21
22
L

READER-PRINTER

This application is a continuation of application Ser. No. 074,146 filed July 16, 1987, now abandoned.

BACKGROUND OF THE INVENTION

1. Field of the Invention

This invention relates to a reader-printer for projecting the images of a microfilm onto a screen and a photosensitive surface.

2. Related Background Art

The image density of images photographically recorded in the frames of a microfilm is irregular in light and shade between the individual frame images. So, a reader-printer is provided with manually operated image density adjusting means such as a knob or a dial so that the density of the image of an output print can be adjusted to the desired light and shade in conformity with the image density of the desired frame image of the film to be printed. That is, by moving the knob or the like, image formation executing condition values such as the amount of image exposure and the development bias value of a printing mechanism relative to a photosensitive member are changed in conformity with the amount of movement of the knob or the like and a print of desired image density is output.

Recent years have seen the advent of a reader-printer of the print image density automatic adjustment type in which the density of a desired frame image to be printed is automatically detected and the image formation executing condition values of the printing mechanism are automatically changed to proper values in conformity with the detected density in order to save the time required for the above-described manual print image density adjustment.

The detection of the density of the image to be printed is divided into the following two types:

(1) detection is effected in the reader system optical path before the image scanning for printing is started; and (2) detection is effected with pre-scanning being done.

However, the type (1) above suffers from a disadvantage that if a density detecting sensor is disposed on the screen of the reader system, its shadow is created and the image breaks off.

The type (2) above suffers from a disadvantage that the step of pre-scanning the image surface of the film by a sensor is required before actually printing is started after the print button has been depressed and therefore, the first copying speed (the output time of the first print) is reduced.

SUMMARY OF THE INVENTION

It is an object of the present invention to provide a reader-printer which is free of the above-noted problems.

It is another object of the present invention to provide a reader-printer which can be changed over to the reader mode and the printer mode within a short time and in which the image density can be detected during the change-over.

It is still another object of the present invention to provide a reader-printer in which the densities of images just before exposed to a photosensitive surface can be successively detected.

The present invention is characterized by the provision of a scanning mirror which is held in a predetermined first angular posture position during the reader mode to form a reader system optical path leading from a film to a projection screen and which, when changed over to the printer mode, is rotatably driven about a pivot from the first angular position to a predetermined second angular position at a predetermined speed and slit-exposes the images of the film to the image exposing portion of a printing mechanism by the travel of the reflected light caused by said rotation, whereby during the rotating operation of said mirror by the change-over to the printer mode, the reflected light from the scanning mirror is received by sensors in succession to thereby accomplish the detection of the image density for automatic print image density adjustment.

With the construction as described above, the detection of the film image density for the automatic print image density adjustment is effected simultaneously with the change-over of the apparatus to the printer mode followed by the start of the rotation of the scanning mirror which in turn is followed by the start of the slit exposure of the film images to the image exposing portion of the printing mechanism and keeping pace with the slit exposure. Accordingly, the problem peculiar to the type (2) above that the first copying speed is reduced does not arise, nor the problem peculiar to the type (1) above can arise and thus, there is provided a reader-printer of this type which is excellent in accuracy and moreover simple in construction as well as inexpensive.

DESCRIPTION OF THE PREFERRED EMBODIMENTS

The drawings schematically show the construction of an example of a reader-printer according to the present invention.

Figure 1:
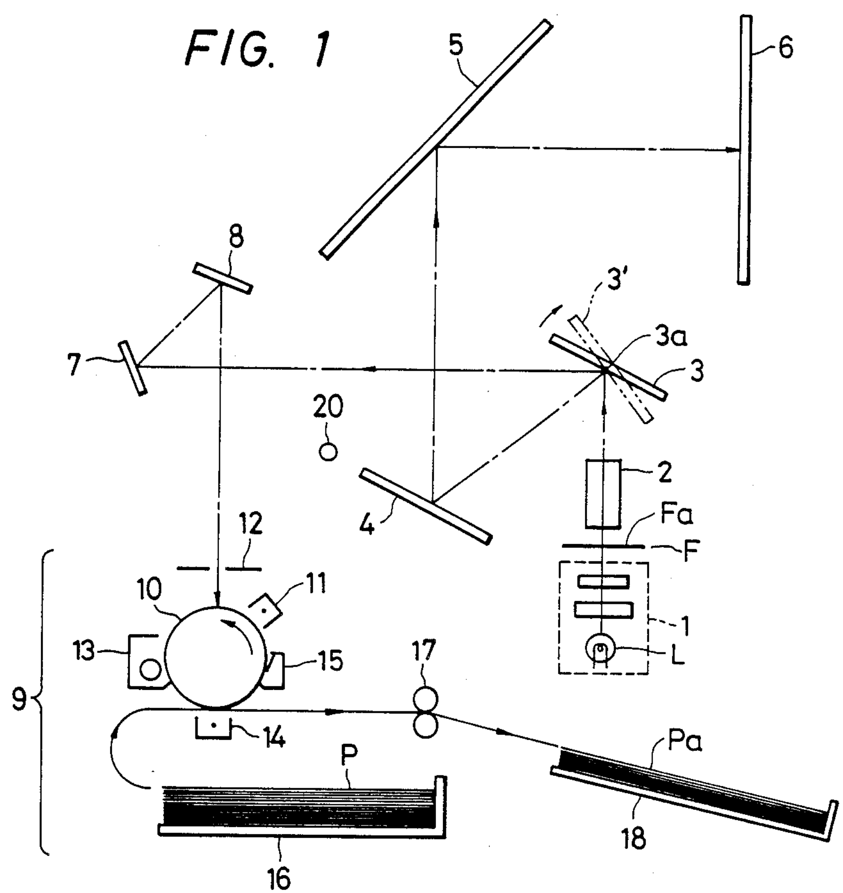
FIG. 1 schematically show the construction of a reader-printer to which the present invention is applied.

Referring to FIG. 1, reference numeral 1 designates a film illuminating unit comprising a lamp L, a condensing lens, an adiabatic film, etc., and letter F denotes a microfilm. A desired frame image portion Fa of the microfilm F is manually or automatically positioned at the position of the film illuminating unit. Reference numeral 2 designates a projection lens, reference numeral 3 denotes a first mirror (a scanning mirror) pivotally driven about a pivot shaft portion **3*a*, reference numeral 4 designates a fixed second mirror, reference numeral 5 denotes a fixed third mirror, and reference numeral 6** designates a projection screen.

The first mirror 3 is held in a first angular position indicated by solid line during the reader mode, whereby a reader system optical path leading to the film illuminating unit 1 → the projection lens 2 → the mirror 3 → the mirror 4 → the mirror 5 → the projection screen 6 is constituted, and the desired image Fa of the film positioned at the illuminating unit 1 is projected as an enlarged image onto the screen 6.

Reference numeral 7 designates a fixed fourth mirror, reference numeral 8 denotes a fixed fifth mirror, and reference numeral 9 designates a printing mechanism. Reference numeral 10 denotes a photosensitive drum rotatably driven in the direction of arrow. Around the photosensitive drum 10, there are disposed necessary image forming process instruments such as a charger 11, a slit plate 12, a developing device 13, a transfer charger 14 and a cleaning device 15. Reference numeral 16 designates a paper supply cassette, reference numeral 17 denotes a fixing device, and reference numeral 18 designates a copy tray.

The first mirror 3 is pivotally moved to a second angular position indicated by chain line during the printer mode, whereby a printer system optical path leading to the projection lens 2 → the mirror 3 → the mirror 7 → the mirror 8 → the photosensitive drum 10 is formed.

Figure 2:
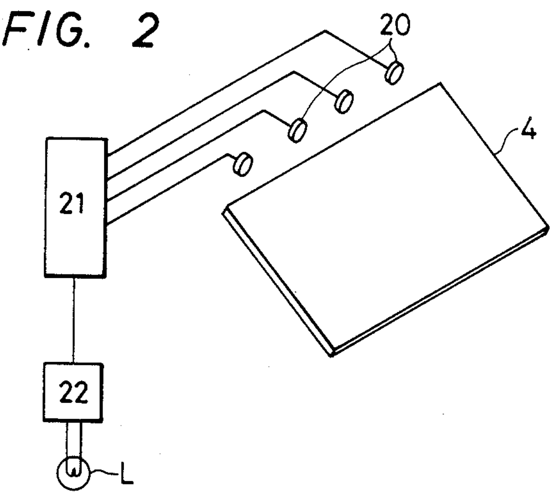
FIG. 2 is a perspective view of a second mirror and sensors.

Reference numeral 20 designates a plurality of sensors (which may be a long one-dimensional sensor array) arranged at intervals near and along the upper side of the second mirror 4 as shown in FIG. 2, reference numeral 21 denotes an operation control circuit, and reference numeral 22 designates a film illuminating lamp output control circuit. The sensors 20 are disposed outside the reader system optical path and the printer system optical path, and receive the image light reflected by the first mirror 3 upon pivotal movement of the first mirror and detect the image density before the image light is directed to the printer system optical path. The sensors 20 are arranged side by side in a direction substantially perpendicular to the direction of travel of the image light.

When change-over is made from the reader mode to the printer mode by change-over means, not shown, the control system of the printing mechanism 9 is switched on and the photosensitive drum 10 is rotatably driven at a predetermined speed. The first mirror 3 held in the first angular position indicated by solid lines is pivotally driven about the pivot shaft 3*a* to the second angular posture position indicated by dots-and-dash line by a driving mechanism, not shown, at a predetermined speed synchronized with the peripheral speed of the photosensitive drum 10.

With this pivotal movement of the mirror 3, the image light of the film entering the mirror 3 from the projection lens 2 side is reflected by the mirror 3 and travels from the direction toward the second mirror 4 to the direction toward the fourth mirror 7. The light having entered the mirror 7 is reflected by this mirror and reaches the surface of the photosensitive drum 10 via the course of the fifth mirror 8 → the slit plate 12. That is, by the pivotal movement of the mirror 3, the enlarged image of the film frame image Fa is slit-exposed on the surface of the photosensitive drum 10, and by the well-known image making principle, a toner image corresponding to the image Fa is formed on the peripheral surface of the photosensitive drum 10, and the toner image is transferred to the surface of a transfer material P fed to the transfer station 14 in synchronism with the rotation of the photosensitive drum 10, whereafter the transfer material P is output to the tray 18 via the fixing device 17. That is, the copy Pa of the desired image Fa of the film is printed out.

On the other hand, in the successive travelling process of the mirror-reflected light from the second mirror 4 side to the direction toward the fourth mirror 7 which results from the pivotal movement of the mirror 3, the sensors 20 are scanned by said reflected light and the quantity of the image light is detected. This detection of the quantity of light is continuously effected until the reflected light corresponding to the leading end portion of the image enters the sensors 20 and the reflected light corresponding to the trailing end portion of the image completely passes through the sensors.

From the quantities of light detected by the sensors 20, the average quantity of light is calculated by the circuit 21, and a proper quantity of film illuminating light corresponding to that quantity of light, i.e., a proper quantity of exposure light for the photosensitive drum 10, is operated, and the illuminating lamp output control circuit 22 is controlled so that said quantity of light is provided. That is, the image density of the image Fa is automatically detected, and the image formation executing conditions are automatically controlled in real time in conformity with that image density. whereby a copy image automatically adjusted to a proper image density is obtained.

When the first mirror 3 arrives at the second angular position, it is pivotally moved back to the first angular position.

In the case of a multi-copy operation, the above-described pivotal movement of the first mirror 3 from the first angular posture position to the second angular posture position and the copying operation of the printing and the copying operation of the printing mechanism are repetitively executed a necessary number of times.

The development bias value and other image formation executing condition values may be controlled on the basis of the measured value of the image density of the film by the sensors 20 to thereby output a print of proper image density.

Also, the mirror 3 may be rotated by 90° or 180° about the optical axis or moved out of the optical path to thereby effect the change-over from the reader mode to the printer mode and photometering may be effected at that time.

Figure 3:
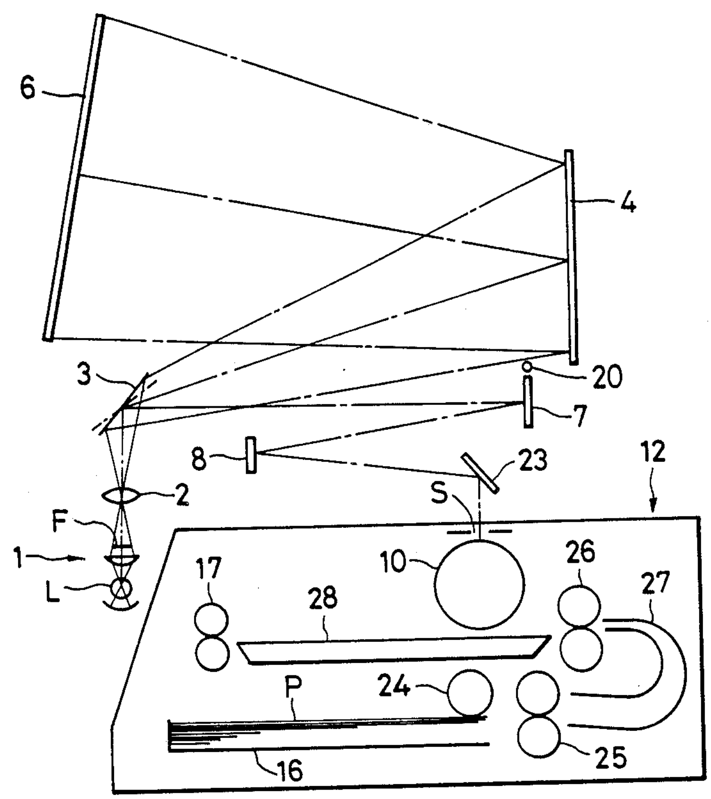
FIG. 3 schematically shows the construction of another embodiment of the present invention.

FIG. 3 shows another embodiment of the present invention. In FIG. 3, parts functionally similar to those in the previously described embodiment are given similar reference numerals. Referring to FIG. 3, a mirror 4 is disposed in the reader system optical path beginning with the first mirror 3, and three mirrors 7, 8 and 23 are disposed in the printer system optical path. The number of mirrors in each optical path is not limited to that shown in the present embodiment, but may be set to any number. Reference numeral 24 designates a paper feeding roller, reference numerals 25 and 26 denote paper conveying rollers, reference numeral 27 designates a paper conveyance guide, and reference numeral 28 denotes a paper conveying mechanism (for example, a conveyor belt).

Figure 4:
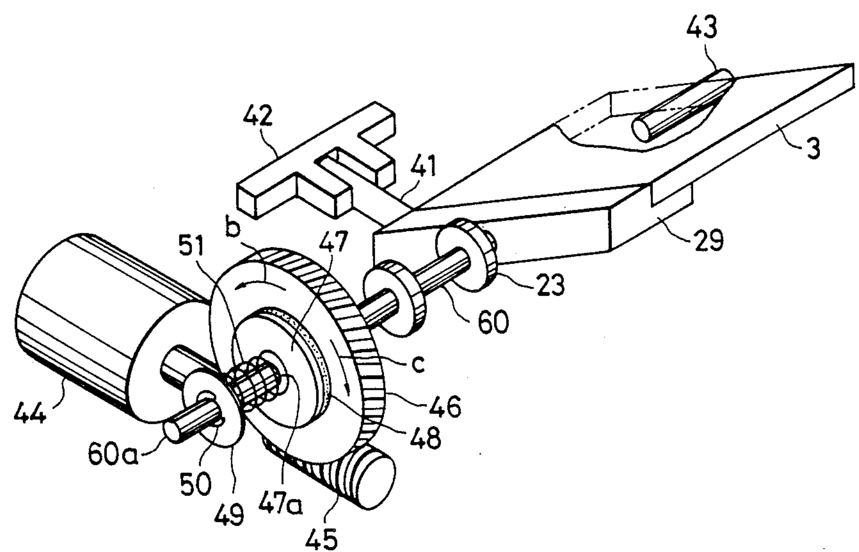
FIG. 4 is a perspective view of a mirror pivotal movement control mechanism.
Figure 5:
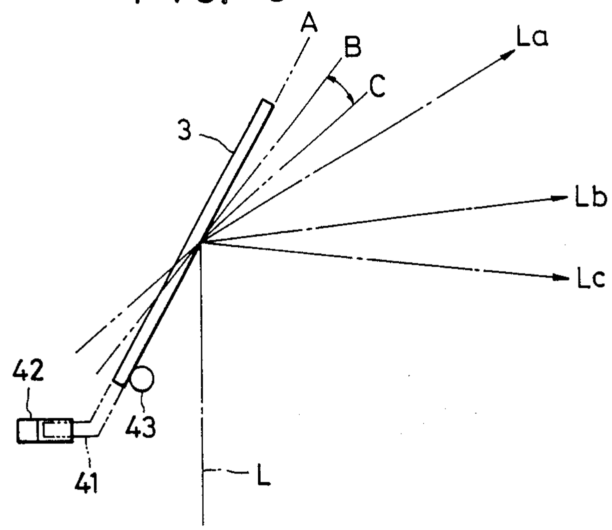
FIG. 5 is a front view of the essential portions of the mechanism shown in FIG. 4.

FIG. 4 is a perspective view of a pivotal movement angle control mechanism for the first mirror 3, and FIG. 5 is a front view of the essential portions thereof.

Reference numeral 41 designates a mirror pivotal movement angle detecting arm mounted on the holder 29 of the first mirror 3, reference numeral 42 denotes a mirror pivotal movement angle detecting sensor comprising a photosensor or the like disposed at the pivotally moved position of the arm 41 during the reader mode, and reference numeral 43 designates a stopper for restraining the first mirror 3 in the reader mode position. The stopper 43 is immovably mounted on a base bed or the like. When the first mirror 3 bears against the stopper 43, the free end portion of the arm 41 is positioned in the optical path of the photosensor 41 to intercept the optical path, whereby it is detected by the sensor 41 that the mirror 3 is in said reader mode position. The stopper 43 lies outside the effective reflecting area of the mirror 3.

Reference numeral 44 designates a mirror pivoting motor comprising a reversible pulse motor or the like, reference numeral 45 denotes a worm mounted on the output shaft of the motor 44, and reference numeral 46 designates a worm wheel which is in meshing engagement with the worm 45. The worm wheel 46 is rotatably and loosely fitted to the pivot shaft 60 of the mirror 3 and held thereby. Although not shown, a stopper for preventing movement of the worm wheel 46 is provided integrally with the pivot shaft 60 on that side of the worm wheel 46 which is adjacent to the mirror 3.

Reference numeral 47 designates an annular disc provided on that side of the worm wheel 46 which is opposite to the mirror 3. The annular disc 47 is fitted against rotation to the end portion **60*a* of the pivot shaft 60 formed into a substantially D-shaped cross-section by means of an internal bore 47*a* formed into a shape similar thereto. Reference numeral 48 denotes a friction pad as a friction transmitting member integrally bonded to that surface of the annular disc 47 which is opposed to the worm wheel 46, and reference numeral 49 designates a spring receiver restrained against slippage on the end portion of the pivot shaft 60 as by a circular lip 50. The friction pad 48 is normally kept urged against the side of the worm wheel 46 by a spring 51 provided between the spring receiver 49 and the disc 47, and the rotational force of the worm wheel 46 is transmitted to the mirror pivot shaft 60 through the pad 48 and the disc 47**.

The control operation of the first mirror 3 will now be described.

During the reader mode, a main switch (not shown) is closed and a reader mode selecting button (not shown) is depressed. At that time, the first mirror 3 is substantially in the reader mode position of FIG. 5, and when the photosensor 42 as the mirror pivotal movement angle detecting sensor is in its ON state, that is, when the detecting arm 41 is positioned in the sensor 42 to intercept the optical path, the mirror pivoting motor 44 is revolved in a reverse direction for a predetermined slight time (time $T_1$) by a control device, not shown, to thereby rotate the worm wheel 46 in the direction of arrow b indicated in FIG. 4 and hold the mirror 3 urged against the stopper 43 with a moderate pressure, whereby the rotational force of the worm wheel 46 is transmitted to the pivot shaft 60. On the other hand, when the sensor 42 is in its OFF state, that is, when the detecting arm 41 is in a position spaced apart from the sensor 42, the motor 44 is revolved for the time until the sensor 42 becomes ON, plus a slight time (time $T_1$), whereby the mirror 3 is held urged against the stopper 43 in a manner similar to what has been described above.

Then, the emergent light L from the projection lens 2 is caused to enter the projection screen 6 by the first mirror 3 and the second mirror 4, whereby the frame image of the film F is enlargedly projected onto the screen 6.

On the other hand, during the printer mode, a printer mode selecting button (not shown) is depressed and, when a print signal is produced, the control device is operated by that signal and the motor 44 is revolved in a forward direction to rotate the worm wheel 46 in the direction of arrow c indicated in FIG. 4, whereby the first mirror 3 is changed over from the reader mode position A of FIG. 5 to the scanning start position B in the printer mode. The motor 44 is continuedly revolved in the forward direction, whereby the first mirror 3 is rotatably driven to a predetermined scanning end position C (FIG. 5) at a predetermined angular speed synchronized with the peripheral speed of the photosensitive drum 10 and slit exposure scanning is effected on the surface of the photosensitive drum and thus, the frame image of the film is printed on printing paper or the like. The pivotal movement scanning angle of the first mirror 3 is controlled by the number of driving steps and the driving frequency of the pulse motor 44.

When the above-described scanning is terminated, the motor 44 is rotated in the reverse direction and is rotatably driven until the aforementioned time $T_1$ passes after the sensor 42 has become ON, and the first mirror 3 is urged against the stopper 43 and is thereby stopped at the reader mode position A of FIG. 5.

Although a pulse motor is used in the above-described embodiment, a DC motor may be used to control the rotational speed. Further, the transmitting mechanism from the motor to the mirror pivot shaft is not limited to the worm, but may also be a spur gear or the like.

As described above, according to the above-described embodiments, the sensor adjustment, the mirror adjustment, etc. during the assembly of the scanning mirror become unnecessary and the representation of the optical axis during the reader mode can be reliably accomplished and also the angular control of the scanning mirror can be easily accomplished.

We claim:

1. A reader-printer comprising:

a first mirror rotatable to a first position in which it is capable of forming a reader optical path for projecting an image onto a screen and a second position in which it is capable of forming a printer optical path for projecting the image onto a photosensitive surface;

a second mirror disposed in said reader optical path for directing light reflected by said first mirror to said screen;

a third mirror disposed in said printer optical path for directing light reflected by said first mirror to said photosensitive surface;

drive means for rotating said first mirror to said first position and said second position; and detecting means for detecting a quantity of light from said image, said detecting means disposed outside said reader optical path and said printer optical path and disposed at a position where it receives the light reflected by said first mirror when said first mirror is rotated to a predetermined angular position different from said first and second positions.

2. A reader-printer according to claim 1, in which a density of an image formed on said photosensitive surface is controlled in accordance with the quantity of light detected by said detecting means.

3. A reader-printer according to claim 1, wherein said first mirror is rotated in synchronism with a movement speed of said photosensitive surface.

4. A reader-printer according to claim 1, further comprising a projection lens for projecting an image, said first mirror reflecting light which passes through said projection lens.

5. A reader-printer according to claim 2, wherein said detecting means includes a plurality of light-receiving elements, each of said light receiving elements arranged in a direction intersecting a rotational direction of said first mirror.

6. A reader-printer according to claim 1, wherein said detecting means detects light reflected by said first mirror while said first mirror is rotated from said first position to said second position.

7. A reader-printer according to claim 1, wherein said drive means includes a drive source, a friction transmitting member for transmitting the force of said drive source to said first mirror, position detecting means for detecting the rotation of said first mirror to a predetermined angular position, and means for controlling said drive source on the basis of the output of said position detecting means.

8. A reader-printer according to claim 7, further comprising stop means for blocking rotation of said first mirror when said first mirror has been rotated to said predetermined angular position.

9. An image forming apparatus provided with a reader optical path for projecting the images of a film onto a screen and a printer optical path for projecting the images of the film onto a photosensitive member, said apparatus comprising:

a rotatable mirror rotatable to a predetermined first angular position during a reader mode to form the reader optical path, and rotatable to a predetermined second angular position during a printer mode to form the printer optical path;

drive means for rotating said mirror between said first angular position and said second angular position; and image density detecting means arranged at a position to receive image light reflected by said mirror when said mirror is inclined at a third angular position between said first and second angular positions, said detecting means for detecting density of the image based on a quantity of the received light.

10. An image forming apparatus according to claim 9, wherein said mirror exposed the image to the photosensitive member while it is rotated from the third angular position to the second angular position.

* * * * *

UNITED STATES PATENT AND TRADEMARK OFFICE
CERTIFICATE OF CORRECTION

PATENT NO. : 4,879,572

DATED : November 7, 1989

INVENTOR(S) : KAZUHIKO ONUKI, ET AL.

It is certified that error appears in the above-identified patent and that said Letters Patent is hereby corrected as shown below:

ON TITLE PAGE:

IN [56] REFERENCES CITED

U.S. PATENT DOCUMENTS, "Grabe" should read --Vor Grabe--.

IN [57] ABSTRACT

Line 7, "disposed in the reader optical" should be deleted.
Line 8, "path for" should be deleted.

COLUMN 1

Line 51, "actually" should read --actual--.
Line 67, "exposed" should read --exposure--.

COLUMN 2

Line 3, "posture" should be deleted.
Line 34, "show" should read --shows--.

COLUMN 3

Line 7, "of arrow." should read --of the arrow.--.
Line 43, "posture" should be deleted and "dots-and-dash line" should read --dot-and-dash lines--.

UNITED STATES PATENT AND TRADEMARK OFFICE

CERTIFICATE OF CORRECTION

PATENT NO. : 4,879,572

DATED : November 7, 1989

INVENTOR(S) : KAZUHIKO ONUKI, ET AL.

It is certified that error appears in the above-identified patent and that said Letters Patent is hereby corrected as shown below:

COLUMN 4

Line 28, "posture" should be deleted.
Line 29, "posture" should be deleted.

COLUMN 5

Line 4, "photosensor 41" should read --photosensor 42--.

COLUMN 7

Line 8, "light receiving elements" should read --light-receiving elements--.

COLUMN 8

Line 23, "exposed" should read --exposes--.

Signed and Sealed this

Thirteenth Day of August, 1991

*Attest:*

HARRY F. MANBECK, JR.

*Attesting Officer*

*Commissioner of Patents and Trademarks*